US011824769B2

(12) United States Patent
Sivabalan et al.

(10) Patent No.: US 11,824,769 B2
(45) Date of Patent: Nov. 21, 2023

(54) INCREMENTALLY ELIMINATING BGP-LU USING SR POLICIES AND PCE

(71) Applicant: Ciena Corporation, Hanover, MD (US)

(72) Inventors: Muthurajah Sivabalan, Kanata (CA); Sami Boutros, Union City, CA (US)

(73) Assignee: Ciena Corporation, Hanover, MD (US)

( * ) Notice: Subject to any disclaimer, the term of this patent is extended or adjusted under 35 U.S.C. 154(b) by 38 days.

(21) Appl. No.: 17/521,136

(22) Filed: Nov. 8, 2021

(65) Prior Publication Data
US 2023/0146374 A1    May 11, 2023

(51) Int. Cl.
*H04L 45/50*    (2022.01)
*H04L 45/00*    (2022.01)
*H04L 47/17*    (2022.01)

(52) U.S. Cl.
CPC .............. *H04L 45/34* (2013.01); *H04L 45/50* (2013.01); *H04L 47/17* (2013.01)

(58) Field of Classification Search
CPC ......... H04L 45/34; H04L 45/50; H04L 47/17; H04L 45/02; H04L 45/64; H04L 45/04
See application file for complete search history.

(56) References Cited

U.S. PATENT DOCUMENTS

| 7,430,176 B2 | 9/2008 | Nalawade et al. |
| 7,684,351 B2 | 3/2010 | Vasseur et al. |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,623,322 B1 * | 4/2020 | Nallamothu .......... H04L 45/745 |
| 10,740,408 B2 | 8/2020 | Ramasamy et al. |

(Continued)

FOREIGN PATENT DOCUMENTS

EP    3 038 301 B1    3/2020

OTHER PUBLICATIONS

Cisco Systems, Inc., "Segment Routing Configuration Guide for Cisco ASR 9000 Series Routers, IOS XR Release 6.4.x," Mar. 27, 2018, 128 pages.

(Continued)

*Primary Examiner* — Atique Ahmed
(74) *Attorney, Agent, or Firm* — Baratta Law PLLC; Lawrence A. Baratta, Jr.

(57) ABSTRACT

Systems and methods for incrementally eliminating Border Gateway Protocol—Labeled Unicast (BGP-LU) in a multi-region network include receiving BGP-LU updates from one or more Area Border Router (ABR) nodes in a multi-region network with the ABR nodes between two areas including a first area utilizing Segment Routing without utilizing BGP-LU and a second area utilizing BGP-LU; and, responsive to a request from a first node in the first area to reach a second node in the second area, providing a Segment Identifier (SID) list to the first node where the SID list is determined based on the Segment Routing in the first area and the BGP-LU updates from the second area.

17 Claims, 4 Drawing Sheets

(56) References Cited

U.S. PATENT DOCUMENTS

| | | |
|---|---|---|
| 10,833,976 B2 | 11/2020 | Saad et al. |
| 10,868,755 B2 | 12/2020 | Filsfils et al. |
| 2006/0176820 A1* | 8/2006 | Vasseur .................. H04L 45/42 370/254 |
| 2008/0008104 A1* | 1/2008 | Previdi ................. H04L 45/04 370/255 |
| 2016/0057049 A1 | 2/2016 | Jacobson et al. |
| 2016/0191324 A1 | 6/2016 | Olofsson et al. |
| 2016/0380888 A1* | 12/2016 | Chen .................... H04L 47/724 370/389 |
| 2018/0097725 A1* | 4/2018 | Wood ..................... H04L 45/60 |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0127913 A1* | 4/2020 | Filsfils ................... H04L 45/50 |
| 2020/0153856 A1 | 5/2020 | Nainar et al. |
| 2020/0162364 A1* | 5/2020 | Chhabra ............. H04L 43/0852 |
| 2020/0220811 A1 | 7/2020 | Shah |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |
| 2021/0258249 A1* | 8/2021 | Torvi ..................... H04L 45/04 |
| 2022/0303212 A1* | 9/2022 | Chan ..................... H04L 45/34 |

OTHER PUBLICATIONS

Radhakrishnan et al., "Egree Engineering over BGP Label Unicast in MPLS-based Networks," IOS-XR BGP Routing Group, Cisco Systems, Inc., 2021 IEEE International Conference on Networking, Architecture and Storage (NAS), Oct. 24, 2021, 4 pages.

C. Bookham et al., "An Architecture for Network Function Interconnect," Jun. 24, 2020, 46 pages.

Feb. 17, 2023, International Search Report and Written Opinion of the International Application No. PCT/US2022/049106.

* cited by examiner

```
                                    ┌─ 50
```

STEP 52 RECEIVING BORDER GATEWAY PROTOCOL – LABELED UNICAST (BGP-LU) UPDATES FROM ONE OR MORE AREA BORDER ROUTER (ABR) NODES IN A MULTI-REGION NETWORK WITH THE ONE OR MORE ABR NODES BETWEEN TWO AREAS INCLUDING A FIRST AREA UTILIZING SEGMENT ROUTING WITHOUT UTILIZING BGP-LU AND A SECOND AREA UTILIZING BGP-LU

↓

STEP 54 RESPONSIVE TO A REQUEST FROM A FIRST NODE IN THE FIRST AREA TO REACH A SECOND NODE IN THE SECOND AREA, PROVIDING A SEGMENT IDENTIFIER (SID) LIST TO THE FIRST NODE WHERE THE SID LIST IS DETERMINED BASED ON THE SEGMENT ROUTING IN THE FIRST AREA AND THE BGP-LU UPDATES FROM THE SECOND AREA

↓

STEP 56 SUBSEQUENT TO CONNECTING THE PCE TO THE SECOND AREA, REMOVAL OF BGP-LU IN THE SECOND AREA, AND UTILIZATION OF SEGMENT ROUTING IN THE SECOND AREA, PROVIDING SID LISTS TO NODES IN EITHER THE FIRST AREA OR THE SECOND AREA BASED ON REQUESTS

INCREMENTALLY ELIMINATING BGP-LU USING SR POLICIES AND PCE

FIELD OF THE DISCLOSURE

The present disclosure generally relates to networking. More particularly, the present disclosure relates to systems and methods for incrementally eliminating Border Gateway Protocol—Labeled Unicast (BGP-LU) using Segment Routing (SR) policies and Path Computation Element (PCE).

BACKGROUND OF THE DISCLOSURE

BGP-LU allows operator to connect different Multiprotocol Label Switching (MPLS) domains (running Label Distribution Protocol (LDP), Resource Reservation Protocol—Traffic Engineering (RSVP-TE), or SR). LDP is incapable of Traffic Engineering (TE). RSVP-TE is capable of supporting TE with fine intent, but it is not suitable for large domains due to scalability issues. SR policy is capable of TE with fine intent without scale concerns. Operators will resort to SR policy due to increasing demand for Service Layer Agreement (SLA) guarantee, network slicing, etc. Also, for bandwidth guaranteed services, tactical TE, etc., operators will increasingly resort to using a PCE. Thus, BGP-LU will become unwanted overhead as networks move towards the new TE trend. BGP-LU is widely deployed today, and there is a need for transitioning from BGP-LU to SR.

Segment Routing—Traffic Engineering (SR-TE) is described, e.g., in Segment Routing Policy Architecture, draft-filsfils-spring-segment-routing-policy-06.txt, May 21, 2018, available at datatracker.ietf.org/doc/html/draft-filsfils-spring-segment-routing-policy, the contents of which are incorporated by reference. Segment Routing (SR) allows a headend node to steer a packet flow along any path. Intermediate per-flow states are eliminated thanks to source routing. The headend node steers a flow into an SR Policy. The header of a packet steered in an SR Policy is augmented with the ordered list of segments associated with that SR Policy.

BRIEF SUMMARY OF THE DISCLOSURE

The present disclosure relates to systems and methods for incrementally eliminating Border Gateway Protocol—Labeled Unicast (BGP-LU) using Segment Routing (SR) policies and Path Computation Element (PCE). The approach described herein obviates the need for BGP-LU (and hence simplifies network operations) while providing end-to-end TE support with fine intent. The present disclosure provides an approach to incrementally displace BGP-LU from networks. Specifically, the present disclosure utilizes a PCE and its ability to learn a destination prefix and its BGP-LU labels from one or more nodes operating as next-hop-self for BGP-LU AF/SAF (Address Family/Subsequent Address Family). Such nodes may or may not be part of an Internet Protocol (IP) anycast group. Further, the present disclosure utilizes the PCE's ability to compute Segment Identifier (SID) lists terminating on nodes operating as next-hop-self to append the corresponding BGP-LU labels to form complete SID lists to reach the ultimate destination. Even further, the present disclosure utilizes the PCE's ability to compute weights for SID list by adding the cost of the destination advertised in a new "Extended Accumulated Interior Gateway Protocol (AIGP) Type Length Values (TLV(s))" to the cost to reach the next-hop-self nodes. Extended AIGP TLV will carry different metric types (e.g., IGP cost, latency, hop-count, etc.).

In various embodiments, the present disclosure includes a method having steps, a system such as a PCE including at least one processor and memory with instructions that, when executed, cause the at least one processor to implement the steps, and a non-transitory computer-readable medium having instructions stored thereon for programming at least one processor to perform the steps. The steps include receiving Border Gateway Protocol—Labeled Unicast (BGP-LU) updates from one or more Area Border Router (ABR) nodes in a multi-region network with the one or more ABR nodes between two areas including a first area utilizing Segment Routing without utilizing BGP-LU and a second area utilizing BGP-LU; and, responsive to a request from a first node in the first area to reach a second node in the second area, providing a Segment Identifier (SID) list to the first node where the SID list is determined based on the Segment Routing in the first area and the BGP-LU updates from the second area.

The steps can further include, subsequent to connecting the PCE to the second area, removal of BGP-LU in the second area, and utilization of Segment Routing in the second area, providing SID lists to nodes in either the first area or the second area based on requests. The one or more ABR nodes can be configured as next-hop-self for BGP-LU Address Family/Subsequent Address Family (AF/SAF). The SID list can terminate on one of the one or more ABR nodes and also includes corresponding BGP-labels to reach the second node. Prior to the receiving, the first area can utilize BGP-LU. The BGP-LU updates can include BGP-LU labels for the second node and accumulated Interior Gateway Protocol (IGP) costs. The accumulated IGP costs can be included in an Extended accumulated IGP metric Type Length Value (TLV). The SID list can be determined based on the accumulated IGP costs including any of IGP cost, latency, and hop-count. The one or more ABR nodes can include a plurality of ABR nodes, and wherein the steps can further include determining multiple SID lists for the first node to reach the plurality of ABR nodes such that the first node performs Equal-cost multipath (ECMP) or Unequal-cost multipath (UCMP).

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a first phase with one are having BGP-LU and one without, and where FIG. 2 is a second phase with BGP-LU removed from both areas.

FIG. 3 is a flowchart of a process to incrementally eliminate BGP-LU from a multi-region network using Segment Routing.

FIG. 5 is a block diagram of an example processing device, which can form a control module for a network element, the PCE, and the like.

DETAILED DESCRIPTION OF THE DISCLOSURE

Figure 1:
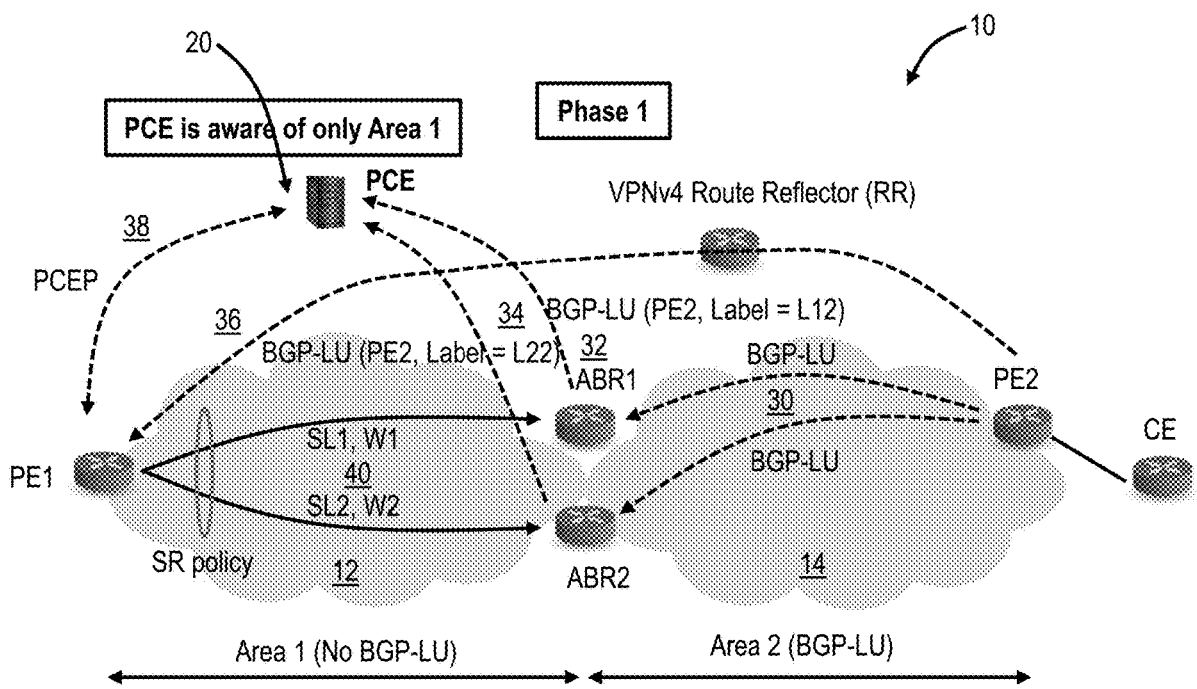
FIGS. 1 and 2 are network diagrams of a multi-region (area) network illustrating a phased approach to eliminate BGP-LU where

Again, the present disclosure relates to systems and methods for incrementally eliminating Border Gateway Protocol—Labeled Unicast (BGP-LU) using Segment Routing (SR) policies and Path Computation Element (PCE). The approach described herein obviates the need for BGP-LU (and hence simplifies network operations) while providing end-to-end TE support with fine intent. The present disclosure provides an approach to incrementally displace BGP-LU from networks. Specifically, the present disclosure utilizes a PCE and its ability to learn a destination prefix and its BGP-LU labels from one or more nodes operating as next-hop-self for BGP-LU AF/SAF (Address Family/Subsequent Address Family). Such nodes may or may not be part of an Internet Protocol (IP) anycast group. Further, the present disclosure utilizes the PCE's ability to compute Segment Identifier (SID) lists terminating on nodes operating as next-hop-self to append the corresponding BGP-LU labels to form complete SID lists to reach the ultimate destination. Even further, the present disclosure utilizes the PCE's ability to compute weights for SID list by adding the cost of the destination advertised in a new "Extended Accumulated Interior Gateway Protocol (AIGP) Type Length Values (TLV(s))" to the cost to reach the next-hop-self nodes. Extended AIGP TLV will carry different metric types (e.g., IGP cost, latency, hop-count, etc.).

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model. Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/html/draft-previdi-6man-segment-routing-header-08) and RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

Phased Approach to Eliminate BGP-LU

Figure 2:
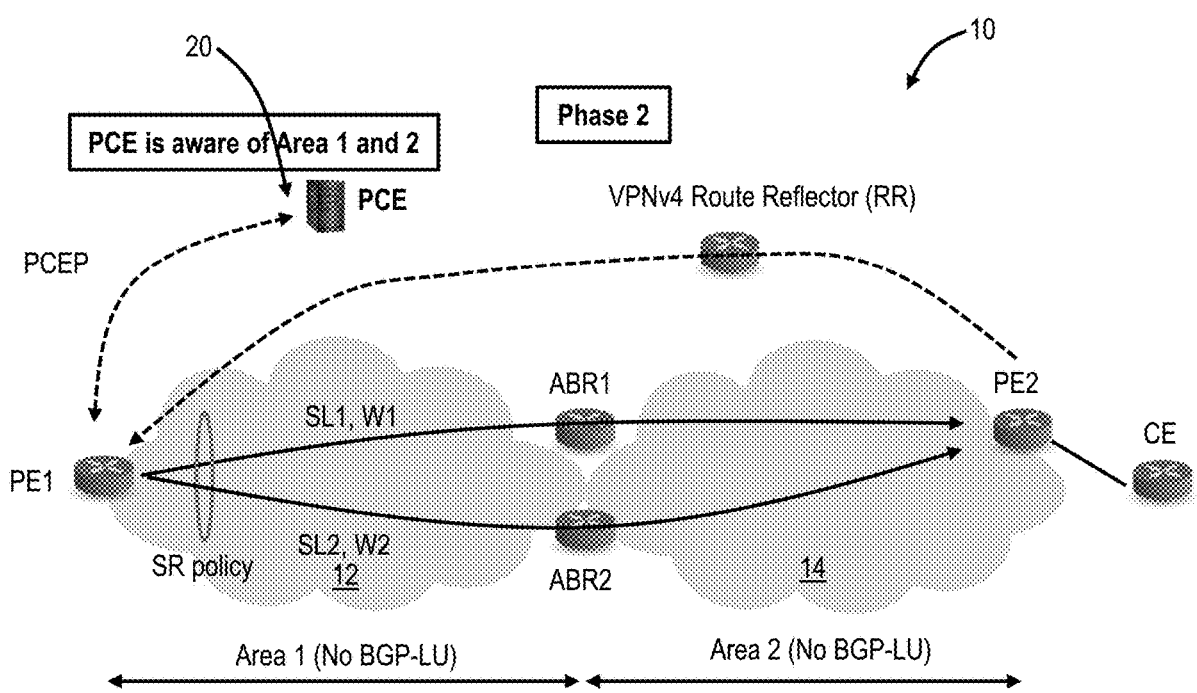

FIGS. 1 and 2 are network diagrams of a multi-region (area) network 10 illustrating a phased approach to eliminate BGP-LU where FIG. 1 is a first phase with one area 12 not having BGP-LU and a second area 14 with BGP-LU, and where FIG. 2 is a second phase with BGP-LU removed from both areas 12, 14. Also, the multi-region network 10 can include multiple nodes or network elements (these terms can be used interchangeably). As known in the art, a node or network element can include a switch, router, or other packet switching/forwarding device. For illustration purposes, the multi-region network 10 is illustrated with a Provider Edge (PE) PE1 node in the area 12, a PE2 node in the area 14, and a Customer Edge (CE) in the area 14. Further, the multi-region network 10 includes Area Border Routers (ABR) ABR1, ABR2 interconnecting the areas 12, 14. Those skilled in the art will recognize a practical deployment may include more areas, as well as various other nodes or network elements that are omitted for simplicity of illustration. If multiple ABRs advertises routes to the egress PE, a PCE 20 can install paths to reach all such ABRs and load-share traffic (e.g., Equal-cost multipath (ECMP) or Unequal-cost multipath (UCMP)).

Again, in the multi-region network 10, BGP-LU is essential to enabling inter-region end-to-end routing, as it provides the communication and connectivity between multiple regions (areas 12, 14). We propose a PCE-based solution that enables operators to deploy a Segment Routing Traffic Engineering (SR-TE) solution to gradually eliminate BGP-LU from their networks, using a PCE 20. This solution enables operators to eliminate another protocol and hence simplify the overall network operation.

Prior to FIG. 1, both the areas 12, 14 can operate with BGP-LU. In FIG. 1, BGP-LU is removed from the area 12. BGP-LU is still deployed in the area 14. The ABR1 and ABR2 learn routes to PE2 via BGP-LU (step 30). The ABR1 and ABR2 act as "next-hop self" and allocate labels L12 and L22 respectively for PE2 (step 32). The ABR1 and ABR2 advertise LU labels L12 and L22 to the PCE 20 (step 34). This advertisement also includes a new BGP TLV called "Extended AIGP TLV" (Accumulated IGP Metric) that can carry different types (e.g., cost, latency, etc.,) of accumulated IGP cost. Note that the existing AIGP TLV can carry only a single value. The AIGP TLV is described, e.g., in RFC 7311, "The Accumulated IGP Metric Attribute for BGP," August 2014, the contents of which are incorporated by reference. In this phase, the PCE 20 has network visibility only into area 12.

The PE1 learns Virtual Private Network v4 (VPNv4) prefixes from PE2 via a VPNv4 Route Reflector (RR) (step 36). The PE1 requests a path from the PCE 20, via PCEP (step 38), which recognizes that PE2 is reachable via more than one node (ABR1 and ABR2) and computes Segment ID (SID) lists SL1 and SL2 to reach ABR1 and ABR2, respectively, from the PE1. Note that ABR1 and ABR2 may or may not belong to an IP anycast group. Note that SLs do not terminate on the actual destination PE2 as well these SLs terminate on different nodes (ABR1 and ABR2) (step 40). The PCE 20 also inserts LU labels L12 and L22 at the bottom of SL1 and SL2, respectively. The SL1 and SL2 have the weight of W1 and W2, respectively. The PCE 20 sets the weights of SL1 and SL2 based on the cost to reach ABR and the cost of the prefix advertised by ABR via the LU update in the Extended AIGP TLV. Thus, the PE1 can load-balance (ECMP or UCMP) traffic destined to the PE2 via ABR1 and ABR2. The PE1 dynamically creates an SR policy to PE2 (endpoint) and using SL1 and SL2.

FIG. 2 illustrates phase two where BGP-LU is also eliminated in the area 14 as well. Here, the PCE 20 now has connectivity and visibility into both areas 12, 14. In phase 2, BGP-LU is removed from both areas 12, 14. The PE1 learns VPNv4 prefixes from the PE2 via the VPNv4 route-reflector. Also, the present disclosure is applicable to VPNv6, 6PE, etc. The PE1 requests a path to the PE2 from the PCE 20 which computes SL1 and SL2 to PE2 via the ABR1 and ABR2, respectively. Note, that since the PCE 20 has visibility into both areas 12, 14, it can now compute end-to-end path.

Process to Eliminate BGP-LU

FIG. 3 is a flowchart of a process 50 to incrementally eliminate BGP-LU from a multi-region network using Segment Routing. Note, the process 50 can also include one domain not utilizing BGP-LU as well. The process 50 is described functionally from the perspective of the PCE 20. As such, the process 50 can be realized as a method having steps, via a system including at least one processor and memory with instructions that, when executed, cause the at least one processor to implement the steps, and as a non-transitory computer-readable medium having instructions stored thereon for programming at least one processor to perform the steps.

The process 50 includes receiving Border Gateway Protocol—Labeled Unicast (BGP-LU) updates from one or more Area Border Router (ABR) nodes in a multi-region network with the one or more ABR nodes between two areas including a first area utilizing Segment Routing without utilizing BGP-LU and a second area utilizing BGP-LU (step 52); and, responsive to a request from a first node in the first area to reach a second node in the second area, providing a Segment Identifier (SID) list to the first node where the SID list is determined based on the Segment Routing in the first area and the BGP-LU updates from the second area (step 54).

The process 50 can further include, subsequent to connecting the PCE to the second area, removal of BGP-LU in the second area, and utilization of Segment Routing in the second area, providing SID lists to nodes in either the first area or the second area based on requests (step 56).

The one or more ABR nodes are configured as next-hop-self for BGP-LU Address Family/Subsequent Address Family (AF/SAF). The SID list terminates on one of the ABR nodes and also includes corresponding BGP-labels to reach the second node.

Prior to the receiving, the first area can utilize BGP-LU. The BGP-LU updates can include BGP-LU labels for the second node and accumulated Interior Gateway Protocol (IGP) costs. The accumulated IGP costs can be included in an Extended accumulated IGP metric Type Length Value (TLV). The SID list can be determined based on the accumulated IGP costs including any of IGP cost, latency, and hop-count.

Again, the process 50 is described functionally from the perspective of the PCE 20. However, there are functions performed as well at the PE1, ABR1, ABR2, and PE2. Generally, there are two steps—

1) Forward BGP-LU updates from nodes operating as next-hop-self for BGP-LU AF/SAF to PCE along with Extended AIGP metric TLVs.

2) Enable ingress PE to autogenerate SR policies to service (e.g., L3VPN) next-hop, and obtain SID list(s) from PCE.

EXAMPLE NODE

Figure 4:
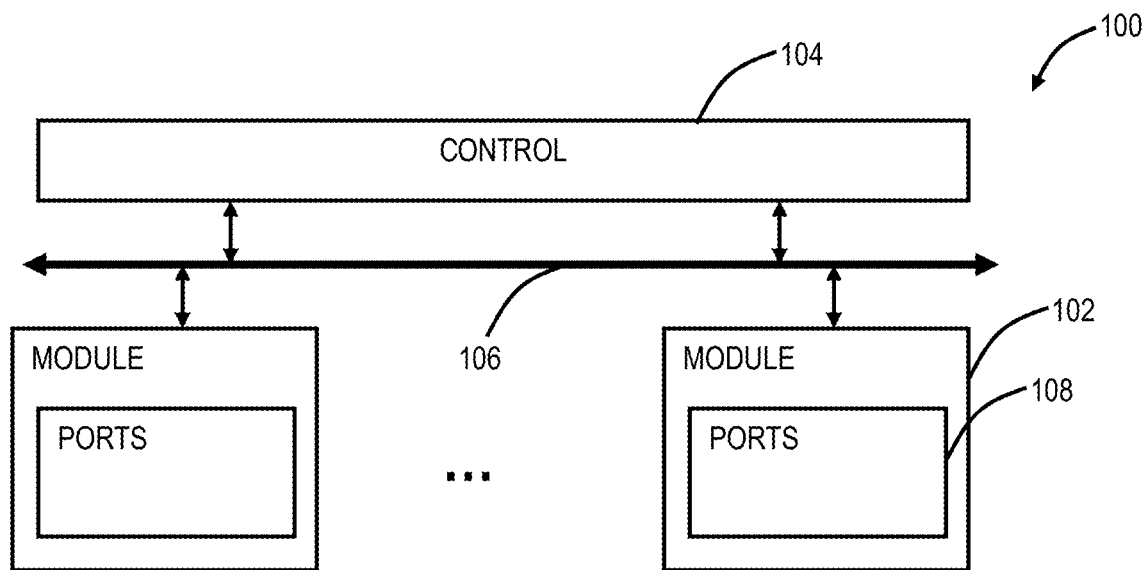
FIG. 4 is a block diagram of an example implementation of a node 100, such as for any of the nodes PE1, PE2, ABR1, ABR2, CE in the network of FIG. 1.

FIG. 4 is a block diagram of an example implementation of a node 100, such as for any of the nodes PE1, PE2, ABR1, ABR2, CE in the network 10. Those of ordinary skill in the art will recognize FIG. 4 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE 20, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 4 is meant to provide a functional view, and those of ordinary skill in the art will recognize actual hardware implementations may vary.

Example Controller

Figure 5:
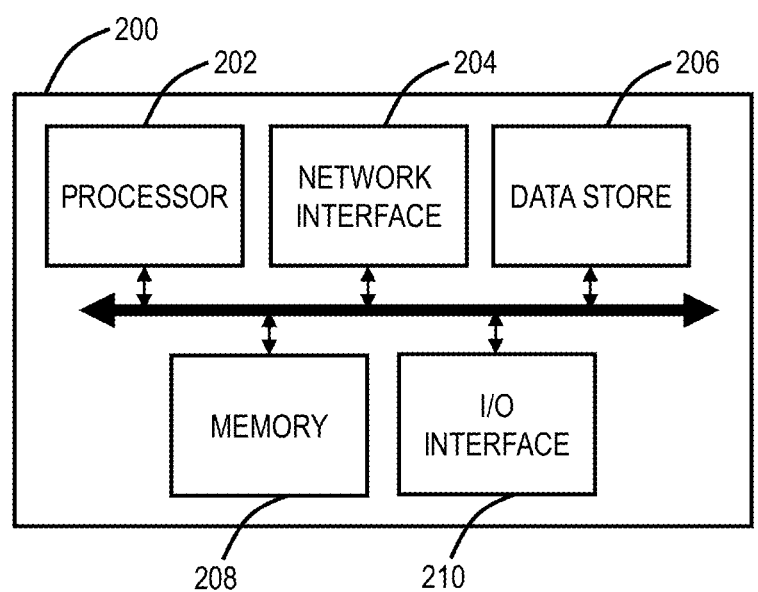

FIG. 5 is a block diagram of an example processing device 200, which can form a control module for a network element, the PCE 20, etc. The processing device 200 can be part of the network element, or a stand-alone device communicatively coupled to the network element. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes 12, the PCE 20, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a processing device associated with a Path Computation Element (PCE) to perform steps of:
    receiving Border Gateway Protocol—Labeled Unicast (BGP-LU) updates from one or more Area Border Router (ABR) nodes in a multi-region network with the one or more ABR nodes between two areas including a first area utilizing Segment Routing without utilizing BGP-LU and a second area utilizing BGP-LU, wherein the PCE lacks visibility into the second area and is connected to the one or more ABR nodes;
    responsive to a request from a first node in the first area to reach a second node in the second area, providing a Segment Identifier (SID) list to the first node where the SID list is determined based on the Segment Routing in the first area and the BGP-LU updates from the one or more ABR nodes connected to the second area; and
    subsequent to connecting the PCE to the second area, removal of utilization of BGP-LU in the second area, and utilization of Segment Routing in the second area where the PCE has visibility therein, providing SID lists to nodes in either the first area or the second area based on requests.

2. The non-transitory computer-readable medium of claim 1, wherein the one or more ABR nodes are configured as next-hop-self for BGP-LU Address Family/Subsequent Address Family (AF/SAF).

3. The non-transitory computer-readable medium of claim 2, wherein the SID list terminates on one of the one or more ABR nodes and also includes corresponding BGP-labels to reach the second node.

4. The non-transitory computer-readable medium of claim 1, wherein, prior to the receiving, the first area utilizes BGP-LU.

5. The non-transitory computer-readable medium of claim 1, wherein the BGP-LU updates include BGP-LU labels for the second node and accumulated Interior Gateway Protocol (IGP) costs.

6. The non-transitory computer-readable medium of claim 5, wherein the accumulated IGP costs are included in an Extended accumulated IGP metric Type Length Value (TLV).

7. The non-transitory computer-readable medium of claim 5, wherein the SID list is determined based on the accumulated IGP costs including any of IGP cost, latency, and hop-count.

8. The non-transitory computer-readable medium of claim 1, wherein the one or more ABR nodes include a plurality of ABR nodes, and wherein the steps further include determining multiple SID lists for the first node to reach the plurality of ABR nodes such that the first node performs Equal-cost multipath (ECMP) or Unequal-cost multipath (UCMP).

9. A method implemented by a Path Computation Element (PCE) comprising steps of:
    receiving Border Gateway Protocol—Labeled Unicast (BGP-LU) updates from one or more Area Border Router (ABR) nodes in a multi-region network with the one or more ABR nodes between two areas including a first area utilizing Segment Routing without utilizing BGP-LU and a second area utilizing BGP-LU, wherein the PCE lacks visibility into the second area and is connected to the one or more ABR nodes;

responsive to a request from a first node in the first area to reach a second node in the second area, providing a Segment Identifier (SID) list to the first node where the SID list is determined based on the Segment Routing in the first area and the BGP-LU updates from the one or more ABR nodes connected to the second area and subsequent to connecting the PCE to the second area, removal of utilization of BGP-LU in the second area, and utilization of Segment Routing in the second area where the PCE has visibility therein, providing SID lists to nodes in either the first area or the second area based on requests.

10. The method of claim 9, wherein the one or more ABR nodes are configured as next-hop-self for BGP-LU Address Family/Subsequent Address Family (AF/SAF).

11. The method of claim 10, wherein the SID list terminates on one of the one or more ABR nodes and also includes corresponding BGP-labels to reach the second node.

12. The method of claim 9, wherein, prior to the receiving, the first area utilizes BGP-LU.

13. The method of claim 9, wherein the BGP-LU updates include BGP-LU labels for the second node and accumulated Interior Gateway Protocol (IGP) costs.

14. The method of claim 13, wherein the accumulated IGP costs are included in an Extended accumulated IGP metric Type Length Value (TLV).

15. The method of claim 13, wherein the SID list is determined based on the accumulated IGP costs including any of IGP cost, latency, and hop-count.

16. The PCE of claim 15, wherein the one or more ABR nodes are configured as next-hop-self for BGP-LU Address Family/Subsequent Address Family (AF/SAF).

17. A Path Computation Element (PCE) comprising:

at least one processor and memory comprising instructions that, when executed, cause the at least one processor to receive Border Gateway Protocol—Labeled Unicast (BGP-LU) updates from one or more one or more Area Border Router (ABR) nodes in a multi-region network with the ABR nodes between two areas including a first area utilizing Segment Routing without utilizing BGP-LU and a second area utilizing BGP-LU, wherein the PCE lacks visibility into the second area and is connected to the one or more ABR nodes, and responsive to a request from a first node in the first area to reach a second node in the second area, provide a Segment Identifier (SID) list to the first node where the SID list is determined based on the Segment Routing in the first area and the BGP-LU updates from the one or more ABR nodes connected to the second area, and subsequent to connecting the PCE to the second area, removal of utilization of BGP-LU in the second area, and utilization of Segment Routing in the second area where the PCE has visibility therein, providing SID lists to nodes in either the first area or the second area based on requests.

* * * * *